United States Patent
Wagner et al.

(10) Patent No.: US 12,473,604 B2
(45) Date of Patent: Nov. 18, 2025

(54) METHOD FOR MONITORING A STEELMAKING PROCESS AND ASSOCIATED COMPUTER PROGRAM

(71) Applicant: ArcelorMittal, Luxembourg (LU)

(72) Inventors: Damien Wagner, Maizières-lès-Metz (FR); Jean-Christophe Huber, Maizières-lès-Metz (FR)

(73) Assignee: ArcelorMittal, Luxembourg (LU)

(*) Notice: Subject to any disclaimer, the term of this patent is extended or adjusted under 35 U.S.C. 154(b) by 914 days.

(21) Appl. No.: 17/603,757

(22) PCT Filed: Apr. 17, 2019

(86) PCT No.: PCT/IB2019/053162
§ 371 (c)(1),
(2) Date: Oct. 14, 2021

(87) PCT Pub. No.: WO2020/212732
PCT Pub. Date: Oct. 22, 2020

(65) Prior Publication Data
US 2022/0177986 A1   Jun. 9, 2022

(51) Int. Cl.
*C21C 5/36* (2006.01)
*C21C 5/54* (2006.01)
*F27D 19/00* (2006.01)
*C21C 5/52* (2006.01)

(52) U.S. Cl.
CPC .......... *C21C 5/36* (2013.01); *C21C 5/54* (2013.01); *F27D 19/00* (2013.01); *C21C 2005/5288* (2013.01); *C21C 2300/06* (2013.01); *F27D 2019/0003* (2013.01)

(58) Field of Classification Search
CPC ....... C21C 5/36; C21C 5/54; C21C 2005/5288; C21C 2300/06; C21C 2200/00; F27D 19/00; F27D 2019/0003
USPC ........................................... 266/99
See application file for complete search history.

(56) References Cited

U.S. PATENT DOCUMENTS

| | | | | |
|---|---|---|---|---|
| 4,474,361 A | * | 10/1984 | Kanemoto | C21C 5/30 75/382 |
| 4,512,802 A | * | 4/1985 | Tohge | C21C 5/005 75/543 |
| 7,819,940 B2 | * | 10/2010 | Reichel | C21C 5/005 75/382 |

(Continued)

FOREIGN PATENT DOCUMENTS

| CA | 942 507 A | 2/1974 |
|---|---|---|
| CN | 103103309 A | 5/2013 |

(Continued)

OTHER PUBLICATIONS

Specification, Claims, Abstract and English Abstract of UA 49279A, published on Sep. 16, 2002.

(Continued)

*Primary Examiner* — Jessee R Roe
*Assistant Examiner* — Michael Aboagye
(74) *Attorney, Agent, or Firm* — Davidson Kappel LLC

(57) ABSTRACT

A monitoring method of a steelmaking process in a steelmaking vessel, wherein matters Mn, each having its respective properties PMn, are charged into said steelmaking vessel so as to produce a liquid steel and a slag.

18 Claims, 2 Drawing Sheets

(56) References Cited

U.S. PATENT DOCUMENTS

| | | | | |
|---|---|---|---|---|
| 8,105,415 B2 * | 1/2012 | McQuillis | ................ | C21C 7/06 75/508 |
| 2009/0031860 A1 | 2/2009 | Reichel et al. | | |
| 2020/0276102 A1 | 9/2020 | Fadli et al. | | |

FOREIGN PATENT DOCUMENTS

| | | |
|---|---|---|
| CN | 106 119 458 A | 11/2016 |
| CN | 107 502 698 A | 12/2017 |
| IN | 2015KO00582 | 10/2017 |
| JP | H11117013 A | 4/1999 |
| JP | 2009052109 A | 3/2009 |
| JP | 2010242178 A | 10/2010 |
| JP | 2011246765 A | 12/2011 |
| JP | 2012167365 A | 9/2012 |
| UA | 75336 C2 | 4/2006 |
| UA | 75337 C2 | 4/2006 |

OTHER PUBLICATIONS

See Search Report of PCT/IB2019/053162 dated Dec. 11, 2019.
Li, et al.: "Mathematical Model of Ultra High Power Electric Arc Furnace Steelmaking Process," Iron and Steel, vol. 30, No. 3, Mar. 1995.

* cited by examiner

METHOD FOR MONITORING A STEELMAKING PROCESS AND ASSOCIATED COMPUTER PROGRAM

The invention is related to a method for monitoring a steelmaking process and to a computer program including software instructions allowing to perform such a method.

BACKGROUND

Steel can be manufactured through two different routes. The first route consists in producing hot metal from a blast furnace and then transforming said hot metal into steel by decarburization in an oxygen converter. The second route consists in melting ferrous scraps in an Electric Arc Furnace (EAF) to directly produce steel.

According to the first route, hot metal from blast furnace is poured into a hot metal ladle which is then poured into a converter (or BOF for Basic Oxygen Furnace) in which scrap have been previously loaded. Oxygen is blown into the converter, for example with a lance, to allow decarburization of hot metal and its transformation into liquid steel. Slag, named converter slag, is a by-product of such a reaction.

Decarburisation reaction releasing energy, scrap are usually added to control the temperature of the produced liquid steel. Mineral additives, such as lime, dolomite, limestone, etc. . . . may further be charged to control the chemical composition and temperature of the produced liquid steel. Those mineral additions may also be used to monitor the chemical composition of the slag, as slag composition has an impact on the equilibrium between liquid steel and slag and thus on promotion of reactions occurring into the liquid steel.

The amounts of loaded hot metal, of each scrap types and of mineral additions thus determine quantity, temperature and final composition of produced liquid steel.

According to the second route, different types of scrap, such as scrap coming from the residues of steel manufacturing process or scrap coming from recycling of steel products may be charged into an EAF. An electric arc, created with electrodes, is used to melt said scrap and turn them into liquid steel. Moreover, oxygen is blown into the EAF to remove impurities brought by scrap. Mineral additives such as lime or dolomite, may also be charged to adjust the composition of the liquid steel or of the slag, as in the converter.

Each of the scrap and other matters, have different properties which have an impact on the final characteristics of liquid steel and their respective amount to be charged into the EAF Document IN2015KO00582 describes a process model for a BOF wherein the amount of mineral fluxes to be added to hot metal and amount of oxygen to be blown is calculated based on a slag analysis, a hot metal composition and an aimed basicity and % MgO of slag. In this method, only fluxes and oxygen content are taken into account to monitor the steelmaking production, while scrap, hot metal or other potential loadable matter are ignored. It so reduces the accuracy of the modelling and limit the possibilities to reach the desired steel composition in an optimal way according to plant specificities.

SUMMARY OF THE INVENTION

It is an object of the present invention to provide a method allowing to monitor a steelmaking process in an efficient and accurate way.

The present invention provides a method comprising the following steps:

a) Defining at least one set of target characteristics $TCS_Y$ of the liquid steel to be produced, b) Defining at least two slag targets $ST_X$, each of these slag targets comprising values representative of the slag properties, c) Calculating, for each slag target $ST_X$, a matter amount $AM_{YX}$ to be charged into the steelmaking vessel allowing to reach the at least one defined set of target characteristics $TCS_Y$, taking into account respective properties of each matter $P_{Mn}$, said matter amount $AM_{YX}$ comprising the individual amount $a_{YX}M_n$ of each matter $M_n$ to be charged, and d) Selecting a matter amount $AM_{YX}$.

The method of the invention may also comprise the following optional characteristics considered separately or according to all possible technical combinations:

coefficient n is superior or equal to 2 the target characteristics $TCS_Y$ of the liquid steel to be produced and/or the at least two slag targets $ST_X$ are defined with a meshing method, the meshing method does not have a constant pitch, the target characteristics $TCS_Y$ comprise at least the liquid steel temperature at the end of the steelmaking process, the liquid steel composition at the end of the steelmaking process or the liquid steel weight at the end of the steelmaking process, each slag target $ST_X$ comprise at least a value representative of the slag basicity, the iron content in the slag or the manganese oxide content in the slag, the matters $M_n$ to be charged are chosen among hot metal, scrap, mineral additions and oxygen, the matters $M_n$ to be charged comprise several scrap with different properties, the matters respective properties $P_{Mn}$ are chosen among a scrap type, a scrap density, a matter composition, a matter temperature, a matter maximum weight, a matter minimum weight, the calculation of step c/ is performed with at least one model, the at least one model is chosen among the group consisting of a physical model, a statistical model, a thermodynamic model, the at least one model comprises equation representative of the mass balance and of the thermal balance of the steelmaking process, the method further comprises a step c'/ of calculating a constraint function $f_c(AM_{YX})$ for each calculated matter amount $AM_{YX}$ and the result of the calculation step c/ is based on said constraint function calculation, the constraint function calculation comprises applying a weighing coefficient $k_n$ to each individual matter amount $a_{YX}M_n$ and summing, for each matter amount $AM_{YX}$ the weighed individual matter amounts $a_{YX}M_n$, the result of the calculation step being then the matter amount $AM_{YX}$ with the lowest calculated constraint function, the weighing coefficient $k_n$ is representative of the availability rate of each matter $M_n$, the method further includes a step c"/ of calculating a scoring function $f_s(AM_{YX})$ for each calculated matter amount $AM_{YX}$ and the selection step d/ is based on said scoring function calculation, the scoring function calculation comprises applying a scoring coefficient $q_i$ to each calculated matter amount $AM_{YX}$, said scoring coefficient $q_i$ depending on the values of the defined target steel characteristics $TCS_Y$ and slag target $ST_X$ for which the matter amount $AM_{YX}$ has been calculated and the selection step consisting then in selecting the matter amount $AM_{YX}$ with the lowest calculated scoring function, the steelmaking vessel is a converter or a Basic Oxygen Furnace, the steelmaking process comprising at least one step of oxygen blowing within the steelmaking vessel and the calculated matter amount $AM_{YX}$ is the amount of each matter $a_{YX}M_n$ to be charged into the steelmaking vessel from the start of the steelmaking process to the end of the single or first blowing step, the steelmaking vessel is an Electric Arc Furnace, the steelmaking vessel is a secondary metallurgy vessel.

The invention is also related to a computer program, including software instructions which, when executed by a processor, implement a method according to anyone of the previous embodiments.

BRIEF DESCRIPTION OF THE DRAWINGS

Other characteristics and advantages of the invention will emerge clearly from the description of it that is given below by way of an indication and which is in no way restrictive, with reference to the appended figures in which.

DETAILED DESCRIPTION

With a method according to the invention it is possible to accurately determine the amount of each matter to be loaded into the steelmaking vessel and to optimize the steelmaking process in terms of reaching the required steel characteristics, matter consumption and energy savings.

Figure 1:
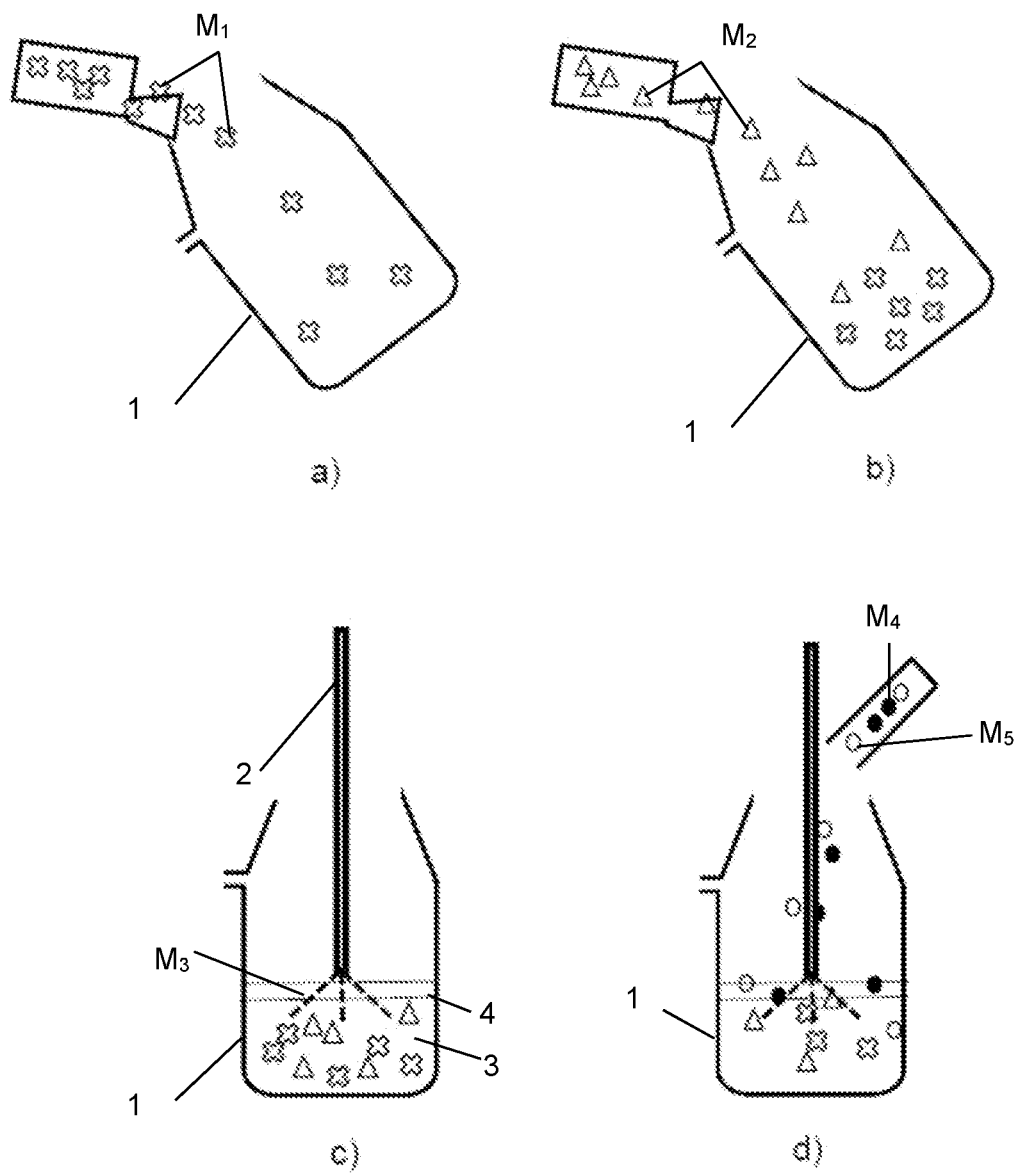
FIG. 1 illustrates a steelmaking process in a converter.

FIG. 1 illustrates the different steps of a steelmaking process in a specific steelmaking vessel named a converter 1. In a), a first matter $M_1$, such as scrap, is charged into the converter 1. The converter 1 is in a tilted position to ease matter loading. In b), a second matter $M_2$, such as hot metal is poured into the converter, still in a tilted position. In step c), the converter 1 has been moved to its standard vertical position and a lance 2 is inserted into the converter to inject a third matter $M_3$, which may be oxygen. Oxygen could be injected in other manner than with a lance, for example through a tuyere located for example in the bottom of the converter. The step of injecting oxygen is called a blowing step, there can be one or more of said blowing step. Then in d), a fourth $M_4$ and a fifth matter $M_5$, such as lime and dolomite or other mineral addition are loaded into the converter. In the converter all loaded matters are heated and melted to form a bath, composed of liquid steel 3 in production and a layer of slag 4 which is an inevitable and necessary by-product of steelmaking process composed notably of impurities to be removed from liquid steel to reach the targeted final steel composition. As illustrated, different types of matters may be charged into a steelmaking vessel and they may be charged into different configurations and/or with different equipment. In addition to the ones previously cited, those matters may also be pig iron, sand, alloying additives such as ferrosilicon FeSi or ferromanganese FeMn.

Each matter $M_n$ to be loaded has its respective matter properties $P_{Mn}$. These matter properties may be chosen among matter composition, matter temperature, matter type, matter density, a maximum available weight of the matter or a minimum weight.

The steelmaking process may be any kind of known steelmaking process such as a converter or BOF (Basic Oxygen Furnace) steelmaking process, an EAF (Electric Arc Furnace) process or any kind of secondary metallurgy treatment such as ladle treatment, AOD converter treatment as they all have liquid steel as final product.

Figure 2:
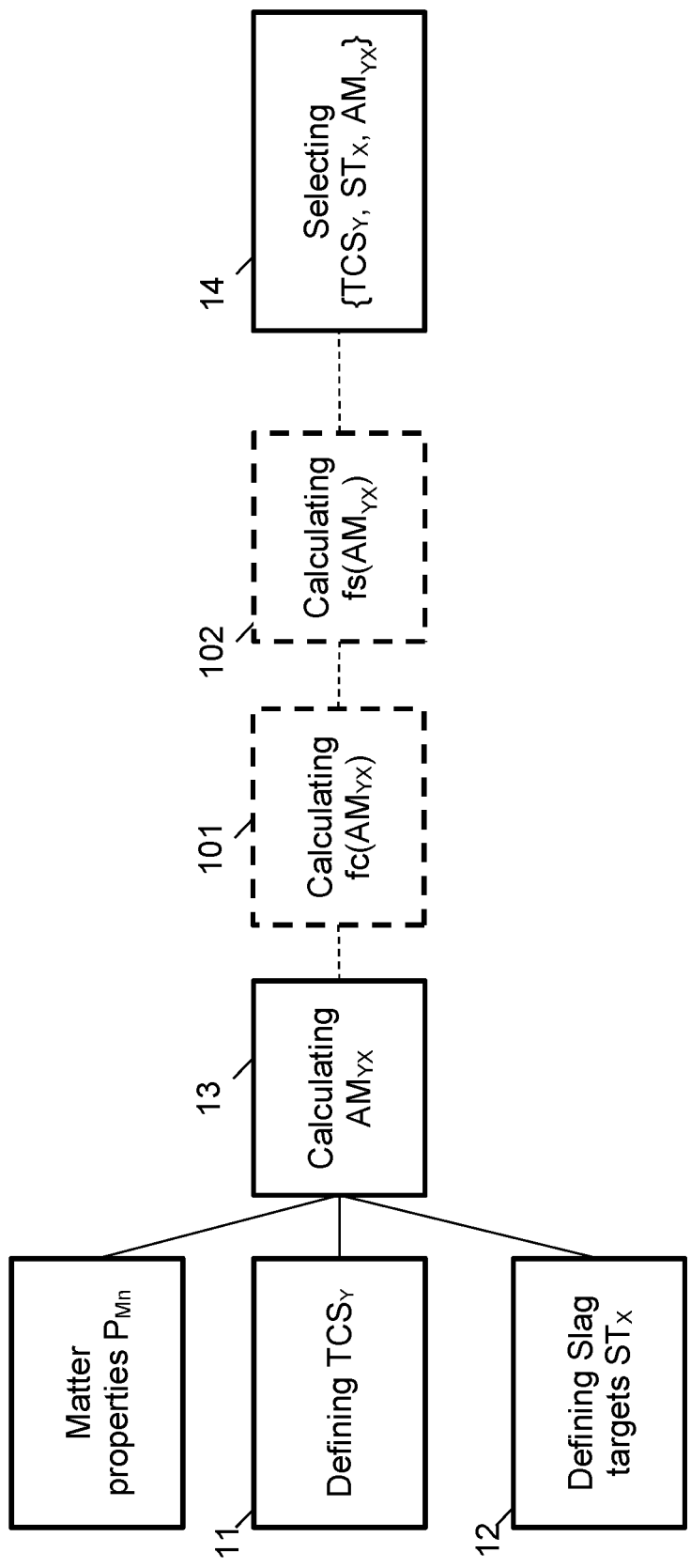
FIG. 2 is a flowchart of a method, according to the invention, for monitoring a steelmaking process Elements in the figures are illustration and may not have been drawn to scale.

FIG. 2 illustrates a flowchart of a method according to the invention. In a first step 11, at least one set of target characteristics $TCS_Y$ of the liquid steel 3 to be produced are defined. These characteristics are the one liquid steel should have at the end of the steelmaking process. By the end of the steelmaking process it is meant when the liquid steel is poured out of the steelmaking vessel. They preferably comprise at least the liquid steel temperature at the end of the steelmaking process, the liquid steel composition at the end of the steelmaking process or the liquid steel weight at the end of the steelmaking process. Those characteristics are usually defined according to the final solid steel product to be manufactured, notably its composition and microstructure, but also according to the expectations of the subsequent casting step. When there is more than one set of target characteristics $TCS_Y$ of the liquid steel 3 there may be different ways to define them. In a preferred embodiment, a range of value is defined for each characteristic of the set and a given number of values to be selected within this range are defined. This is called a meshing. As a matter of example, for the characteristic steel carbon content, the defined range of value is between 400 and 600 ppm and the number of values to select in this range is of 5. The carbon content will then be defined as 400, 450, 500, 550 and 600 ppm in the different sets of steel target characteristics. In this example the pitch between two selected values is equal but it could also be possible to set a shorter pitch near the value range borders if necessary.

In a second step 12, at least two slag targets $ST_X$ are defined. Each of these slag targets comprise value representative of the slag characteristics such as its basicity, its iron content and/or its magnesium oxide MgO content. Basicity of slag maybe calculated as % CaO/% $SiO_2$. The basicity of slag is an important characteristic for controlling removal of impurities from the liquid steel, such as phosphorus or sulfur. The same method as the meshing method described for the definition of target steel characteristics may be used to define the slag targets.

MgO and FeO content of the slag is also important. The slag contains dissolved calcium compounds and acidic compounds that cause MgO to dissolve from the refractory bricks of the vessel lining into the slag. MgO dissolves into the slag based on relationships of FeO content, basicity and temperature. The lower the slag basicity, the higher the MgO requirement for the slag. An increase in FeO and temperature also increases the MgO requirement of the slag.

In a third step 13, a matter amount $AM_{YX}$ is calculated for each combination of slag target $ST_X$ and target steel characteristics $TCS_Y$ taking into account the respective matter properties $P_{Mn}$. This matter amount $AM_{YX}$ comprise the individual amount $a_{YX}M_n$ of each matter $M_n$ to be charged. This calculation is preferably performed using one or several models. These models are based on a set of equations which describe the behavior of elements within the steelmaking vessel. They may be of several types:

Elemental mass balances: they ensure that the amount of each chemical element entering the vessel will correspond to the amount of the same element in the outputs. They are there to ensure that what is entering is going out of the vessel. For each element "elmt", the corresponding element balance can be written as:

$$\sum_{M_n}\left[IO_{Mn} \times Y_{Mn} \times a_{YX}M_n \times \left(\sum_{elmt}(w_{Mn,comp} \times w_{comp,elmt})\right)\right] = 0$$

Wherein:
$IO_{Mn}$ is a coefficient equals to +1 if the considered matter is an input (for example hot metal, scrap . . . ) and −1 if it is an output (for example carbon monoxide which escapes from the steelmaking vessel in a gaseous form).
$Y_{Mn}$ is a matter yield attached to each matter, its values being between 0 and 1. "1" means that 100% of the matter's amount is reaching the bath inside the vessel. Indeed, some of the matter may be either strongly reactive or volatile and go out with the fumes escaping the vessel without ever reaching the bath inside the vessel.
$a_{YX}M_n$ is the individual amount of each matter $M_n$ to be charged (the value to be calculated)
$w_{Mn,comp}$ is the matter $M_n$ content in compound "comp" (for example CaO)
$w_{comp,elmt}$ is the compound "comp" content in the element "elmt" (for example Ca is an element of compound CaO)
Thermal balance. This is the balance ensuring that the energy going in is equal to the energy going out of the system. It ensures that the amounts will be compatible with the reaching of the final steel temperature if any is needed. The energy of a matter may be calculated in a separate module and stored in its enthalpy coefficient ($H_{Mn}$) which is expressed in MJ/kg. It depends on the composition, temperature and state of the considered matter (solid, liquid metal . . . ). A manual enthalpy may also be entered if an external calculation is used to define it. In addition to the energy that is conveyed by the matters, part of it is lost through thermal radiations. This is called thermal losses. They may be statistically predicted based on parameters such as the waiting time of the vessel between two heats or the final temperature of steel.
The thermal balance can be expressed as:

$$\sum_{M_n}[IO_{Mn} \times Y_{Mn} \times a_{YX}M_n \times H_{Mn}] + ThermalLosses = 0$$

Wherein:
$IO_{Mn}$ is a coefficient equals to +1 if the considered matter is an input (for example hot metal, scrap . . . ) and −1 if it is an output (for example carbon monoxide which escapes from the steelmaking vessel in a gaseous form).
$Y_{Mn}$ is a matter yield attached to each matter, its values being between 0 and 1. "1" means that 100% of the matter's amount is reaching the bath inside the vessel. Indeed, some of the matter may be either strongly reactive or volatile and go out with the fumes escaping the vessel without ever reaching the bath inside the vessel.
$a_{YX}M_n$ is the individual amount of each matter $M_n$ to be charged (the value to be calculated)
$HM_n$ is the enthalpy coefficient of the considered matter $M_n$ Process weights constraints: they ensure that the proposed amounts are within the specified allowed ranges.
Process contents constraints: they ensure that the proposed amounts are compatible with the specified ranges on the outputs analyses (steel and slag).
Statistical predictions: they describe some physical behaviors that cannot be defined with a direct relationship. They are used to "guess" some final parameters, knowing some others. Typical statistical relationships are multilinear regressions or neural networks.

The full set of equations thus obtained is then solved with a solver, such as a SIMPLEX linear solver, for each combination of slag target $ST_X$ and target steel characteristics $TCS_Y$. When a solution can be obtained, the output is a matter amount $AM_{YX}$ comprising the individual amount $a_{YX}M_n$ of each matter $M_n$ to be charged.

It may happen that more than one solution can solve a set of equations for a given combination $\{TCS_Y, ST_X\}$. In that case, in an optional step 101, a constraint function $f_c(AM_{YX})$ is calculated for each calculated matter amount $AM_{YX}$ and the selection is performed based on this calculated constraint function. Constraint may be understood as an energy cost or an availability rate of each matter. As a matter of example, this constraint function calculation comprises the application of a weighing coefficient $k_n$ to each individual matter amount $a_{YX}M_n$ and summing, for each matter amount $AM_{YX}$, the weighed individual matter amounts $a_{YX}M_n$. The weighing coefficient $k_n$ may be representative of the availability rate of each matter $M_n$ or maybe chosen depending on the internal strategy of the plant which may wish to promote use of one matter compared to another. This coefficient $k_n$ could also be representative of the cost of each matter $M_n$. Then the only retained solution is the matter amount $a_{YX}M_n$ with the lowest calculated constraint function.

$$fc(AM_{YX}) = \sum_n k_n \times a_{YX}M_n$$

In a fourth step 14, one of the previously calculated matter amount $AM_{YX}$ is selected, together with its associated combination of steel target characteristics $TCS_Y$ and slag target $ST_X$.

In an optional step 102, a scoring function $f_s(AM_{YX})$ is calculated. This scoring function takes into account the combination of target steel characteristics $TCS_Y$ and slag target $ST_X$ from which the matter amount $AM_{YX}$ has been calculated. This scoring function may comprise bonus/malus coefficients $q_i$ applied to given target steel characteristics $TCS_Y$ and slag targets $ST_X$. As a matter of example, if the carbon content is defined as 400, 450, 500, 550 and 600 ppm in the different defined sets of steel target characteristics but the plant has a preference for 450 ppm and would prefer avoiding 600 ppm then it is possible to apply a coefficient q of +5 for matter amounts $AM_{YX}$ calculated for the target steel characteristics $ST_X$ comprising the value carbon content of 600 ppm and a coefficient of −5 for the matter amounts $AM_{YX}$ calculated for the target steel characteristics $ST_X$ comprising the value carbon content of 450 ppm. Coefficients $q_i$ may also be defined according to slag viscosity, lime saturation in slag or any other suitable value representative of the slag or of the steel properties, whether they are comprised into the set of target steel characteristics $TCS_Y$ or slag target $ST_X$ or may be calculated or simulated thereof.

The selection step 14 consists then in selecting the matter amount $AM_{YX}$ with the lowest calculated scoring function which may be expressed as:

$$fs(AM_{YX}) = \sum_i q_i$$

Or may include the calculated constraint function:

$$fs(AM_{YX}) = fc(AM_{YX}) + \sum_i q_i$$

Once the matter amount $A_{YX}M_n$ is selected, information can be sent to the operator in charge of the steelmaking process, through a human machine interface for example or information could also been sent to automatic loading means in charge of loading the steelmaking vessel with different matters $M_n$.

All these steps, may be translated into a series of software instructions and the method can be performed by a computer program including said software instructions.

When the steelmaking process is performed in a converter and as previously describe in relation to FIG. 1, the steelmaking process comprise at least one blowing step. In one embodiment of the invention, the calculated matter amount $AM_{YX}$ is the amount of each matter $a_{YX}M_n$ to be charged into the steelmaking vessel from the start of the steelmaking process to the end of the single or first blowing step.

An example of results obtained with a method according to the invention is illustrated below. In this example the steelmaking process is performed in a converter. The available matters and their respective properties are listed in table 1. Among those properties are the composition in some chemical elements, a minimum weight to be loaded ($W_{min}$) and the temperature. A weighing coefficient $k_n$ was also associated to each matter according to the plant strategy. Eight target steel characteristics were defined and are detailed in table 2. Among those characteristics are the final composition in some elements, expressed in ppm, the final content of oxygen expressed in ppm in produced liquid steel and the final temperature of the produced liquid steel. In all tables, percentages are weight percentages. Six slag target characteristics were defined, comprising the basicity of the slag and its MgO content. Those slag targets are illustrated in table 3.

TABLE 3

|  | Basicity | % MgO |
|---|---|---|
| $ST_1$ | 3 | 3 |
| $ST_2$ | 3 | 5 |
| $ST_3$ | 3 | 7 |
| $ST_4$ | 4 | 3 |
| $ST_5$ | 4 | 5 |
| $ST_6$ | 4 | 7 |
| $ST_7$ | 5 | 3 |
| $ST_8$ | 5 | 5 |
| $ST_9$ | 5 | 7 |

Then, the equations of the thermal and of the elemental mass balance as previously described were established and solved by a SIMPLEX linear solver, for each combination of slag target $ST_X$ and target steel characteristics $TCS_Y$. Results of such solving are matter amount $AM_{YX}$ which served as basis of the scoring function calculation according to formula: $fs(AM_{YX})=fc(AM_{YX})+\Sigma_i q_i$. Results of such global function calculation are illustrated in table 4. NO means that there was no possible solution for the given combination, i.e. it was not possible to reach the given target steel characteristics through given slag target by using the available matters.

The selected amount $AM_{24}$ is the one resulting from the combination between $TCS_2$ and $ST_4$, detail of which being given in table 5.

TABLE 5

| $M_n$ | $A_{24}M_n$ |
|---|---|
| Hot Metal (in kg) | 850 |
| Scrap 1 (in kg) | 209.1 |
| Scrap 2 (in kg) | 0 |
| Reverts | 0 |
| Pig iron (in kg) | 7.8 |
| O2 (in Nm3) | 46.9 |
| Lime (in kg) | 47.5 |
| Dolomite (in kg) | 7.2 |
| Sand (in kg) | 6.3 |
| Ore (in kg) | 11.9 |
| FeSi | 0 |

With the method according to the invention it is possible to monitor accurately the steelmaking process by calculating the amount of each matter to be charged into the steelmaking vessel taking into the respective properties of said matters but also by taking into all chemical and thermal interactions between those matters during the steelmaking process. With a method according to the invention it is possible to reach the target steel characteristics but to do it in an optimal manner taking into each plant specificities (available matters, specific chemistries of each matter, internal strategies such as by-product recycling, local products consumption . . . ).

TABLE 1

| Matter $M_n$ | T(° C.) | % Fe | % C | % Mn | % P | % S | % Si | % Al | % Cu | % $SiO_2$ | % $Al_2O_3$ | % CaO | % MgO | $W_{Min}$ | $k_n$ |
|---|---|---|---|---|---|---|---|---|---|---|---|---|---|---|---|
| Hot Metal | 1350 | 94 | 4.5 | 0.2 | 0.08 | 0.025 | 0.5 | — | 0.05 | — | — | — | — | 700 | 285 |
| Scrap 1 | 25 | 99 | 0.1 | 0.1 | 0.02 | — | — | 0.05 | — | — | — | — | — | No | 300 |
| Scrap 2 | 25 | 92.6 | 0.5 | 0.39 | 0.08 | 0.06 | — | 0.2 | 0.63 | 1.15 | 0.4 | 1 | 0.26 | No | 300 |
| Reverts | 25 | 88 | — | — | 0.2 | — | — | — | — | 2.5 | 0.5 | 4 | 2 | No | 200 |
| Pig iron | 25 | 94 | 4.4 | 0.5 | 0.1 | 0.1 | 0.6 | — | — | 0.15 | 0.15 | — | — | No | 291 |
| O2 | 25 | — | — | — | — | — | — | — | — | — | — | — | — | No | 70 |
| Lime | 25 | — | — | — | — | — | — | — | — | 0.5 | 0.0 | 96.4 | 0.0 | No | 90 |
| Dolomite | 25 | — | — | — | — | — | — | — | — | 0.0 | 0.0 | 58.0 | 38.5 | No | 100 |

TABLE 1-continued

| Matter $M_n$ | T(° C.) | % Fe | % C | % Mn | % P | % S | % Si | % Al | % Cu | % $SiO_2$ | % $Al_2O_3$ | % CaO | % MgO | $W_{Min}$ | $k_n$ |
|---|---|---|---|---|---|---|---|---|---|---|---|---|---|---|---|
| Sand | 25 | — | — | — | — | — | — | — | — | 100 | — | — | — | No | 116.5 |
| Ore | 25 | 65 | — | — | 0.08 | — | — | — | — | — | — | — | — | No | 120.5 |
| FeSi | 25 | 25 | — | — | — | — | 75 | — | — | — | — | — | — | No | 1350 |

TABLE 2

|  | C | Fe | Mn | P | S | Ni | Cu | Cr | Al | O(ppm) | T(° C.) |
|---|---|---|---|---|---|---|---|---|---|---|---|
| TCSy 1 | 459.0 | 997 | 388.5 | 536.2 | 85.0 | 186.7 | 170.0 | 529.5 | 170.0 | 0.0 | 475 | 1600 |
| TCSy 2 | 459.0 | 997 | 388.5 | 536.2 | 85.0 | 186.7 | 170.0 | 529.5 | 170.0 | 0.0 | 475 | 1620 |
| TCSy 3 | 459.0 | 997 | 388.5 | 536.2 | 85.0 | 186.7 | 170.0 | 529.5 | 170.0 | 0.0 | 550 | 1660 |
| TCSy 4 | 459.0 | 997 | 388.5 | 536.2 | 85.0 | 186.7 | 170.0 | 529.5 | 170.0 | 0.0 | 550 | 1720 |
| TCSy 5 | 459.0 | 997 | 388.5 | 536.2 | 85.0 | 186.7 | 170.0 | 529.5 | 170.0 | 0.0 | 925 | 1660 |
| TCSy 6 | 459.0 | 997 | 388.5 | 536.2 | 85.0 | 186.7 | 170.0 | 529.5 | 170.0 | 0.0 | 925 | 1720 |
| TCSy 7 | 459.0 | 997 | 388.5 | 536.2 | 85.0 | 186.7 | 170.0 | 529.5 | 170.0 | 0.0 | 1150 | 1600 |
| TCSy 8 | 459.0 | 997 | 388.5 | 536.2 | 85.0 | 186.7 | 170.0 | 529.5 | 170.0 | 0.0 | 1150 | 1720 |

TABLE 4

|  | $TCS_1$ | $TCS_2$ | $TCS_3$ | $TCS_4$ | $TCS_5$ | $TCS_6$ | $TCS_7$ | $TCS_8$ |
|---|---|---|---|---|---|---|---|---|
| $ST_1$ | NO | 322 | 328 | 353 | 331 | 365 | NO | NO |
| $ST_2$ | NO | 322 | 329 | 359 | 333 | 502 | NO | NO |
| $ST_3$ | NO | 323 | 331 | 366 | 335 | NO | NO | NO |
| $ST_4$ | NO | 319 | 323 | 335 | 325 | 339 | NO | 343 |
| $ST_5$ | NO | 320 | 324 | 338 | 326 | 343 | NO | 347 |
| $ST_6$ | NO | 320 | 324 | 340 | 325 | 346 | NO | 352 |
| $ST_7$ | NO | 321 | 322 | 331 | 323 | 328 | NO | 336 |
| $ST_8$ | NO | 321 | 322 | 332 | 323 | 330 | NO | 338 |
| $ST_9$ | NO | 322 | 322 | 334 | 324 | 331 | NO | 341 |

What is claimed is:

1. A method of charging matters into a steelmaking vessel, wherein matters $M_n$, each having respective properties $P_{Mn}$, are charged into the steelmaking vessel so as to produce a liquid steel and a slag, the method comprising the steps of:
   a. inputting, into a computer program, at least one set of target characteristics $TCS_y$ of the liquid steel to be produced, the at least one set of target characteristics TCSy includes at least one of a liquid steel temperature at an end of the steelmaking process, a liquid steel composition at the end of the steelmaking process and a liquid steel weight at the end of the steelmaking process;
   b. inputting, into the computer program, at least two slag targets $ST_X$, each of the at least two slag targets $ST_X$ comprising values representative of properties of the slag,
   c. calculating, by the computer program, for each slag target of the at least two slag targets $ST_X$, a matter amount $AM_{YX}$ to be charged into the steelmaking vessel allowing to reach the at least one defined set of target characteristics $TCS_Y$, taking into account respective properties of each matter $P_{Mn}$, at least some of the matters respective properties $P_{Mn}$ being chosen among a scrap type, a scrap density a matter composition, a matter temperature, a matter maximum weight and a matter minimum weight, the matter amount $AM_{YX}$ comprising an individual amount $a_{YX}M_n$ of each of the matters $M_n$ to be charged, and
   d. selecting one of the matter amounts $AM_{YX}$ calculated in step c, together with its associated $TCS_Y$ and slag target $ST_X$
   e. charging the steelmaking vessel with the matter amount $AM_{YX}$ wherein x is a number of slag targets ($ST_X$), and y is a number of sets of target characteristics ($TCS_y$).

2. The method as recited in claim 1 wherein coefficient n is greater than or equal to 2.

3. The method as recited in claim 1 wherein the target characteristics $TCS_Y$ of the liquid steel to be produced or the at least two slag targets $ST_X$ are defined with a meshing method.

4. The method as recited in claim 3 wherein the meshing method does not have a constant pitch.

5. The method as recited in claim 1 wherein each slag target $ST_X$ includes at least a value representative of slag basicity, an iron content in the slag or a manganese oxide content in the slag.

6. The method as recited in claim 1 wherein the matters $M_n$ to be charged are chosen among hot metal, scrap, mineral additions and oxygen.

7. The method as recited in claim 6 wherein the matters $M_n$ to be charged comprise scraps with different properties.

8. The method as recited in claim 1 wherein the calculating step c is performed with at least one model.

9. The method as recited in claim 8 wherein the at least one model is selected from the group consisting of a physical model, a statistical model, and a thermodynamic model.

10. The method as recited in claim 8 wherein the at least one model includes an equation representative of a mass balance and of a thermal balance of the steelmaking process.

11. The method as recited in claim 1 wherein the method further comprises a step of calculating a constraint function $f_c(AM_{YX})$ for each calculated matter amount $AM_{YX}$, a result of the calculating step c being based on the constraint function calculation.

12. The method as recited in claim 11 wherein the constraint function calculation includes applying a weighing coefficient $k_n$ to each individual matter amount $a_{YX}M_n$ and summing such that $$fc(AM_{YX}) = \Sigma_n k_n \times a_{YX} M_n$$

the result of the calculation step being then the matter amount $AM_{YX}$ with the lowest calculated constraint function.

13. The method as recited in claim 12 wherein the weighing coefficient $k_n$ is representative of the availability rate of each matter $M_n$.

14. The method as recited in claim 1 wherein the method further includes, after step c and before step d, of calculating a scoring function $f_s$ ($AM_{YX}$) for each calculated matter amount $AM_{YX}$ and wherein the selection step d is based on the scoring function calculation.

15. The method as recited in claim 14 wherein said scoring function calculation includes applying a scoring coefficient $q_i$ to each calculated matter amount $AM_{YX}$, the scoring coefficient $q_i$ depending on values of the defined target steel characteristics $TCS_Y$ and associated slag target $ST_X$ of the at least two slag targets for which the matter amount $AM_{YX}$ has been calculated and the selection step consisting of selecting the matter amount $AM_{YX}$ with the lowest calculated scoring function.

16. The method as recited in claim 1 wherein the steelmaking vessel is a converter or a Basic Oxygen Furnace, the steelmaking process comprising at least one step of oxygen blowing within the steelmaking vessel and the calculated matter amount $AM_{YX}$ is the amount of each matter $a_{YX}M_n$ to be charged into the steelmaking vessel from a start of the steelmaking process to an end of a single or first blowing step.

17. The method as recited in claim 1 wherein the steelmaking vessel is an Electric Arc Furnace.

18. The method as recited in claim 1 wherein the steelmaking vessel is a secondary metallurgy vessel.

* * * * *